UNITED STATES PATENT OFFICE.

LESLIE W. AUSTIN, OF SAN JOSE, CALIFORNIA.

TREATING MANGANESE-SILVER ORES.

1,327,974.  Specification of Letters Patent.  Patented Jan. 13, 1920.

No Drawing.  Application filed April 14, 1919. Serial No. 289,939.

*To all whom it may concern:*

Be it known that I, LESLIE W. AUSTIN, a citizen of the United States, residing at San Jose, in the county of Santa Clara and State of California, have invented certain new and useful Improvements in Treating Manganese Silver Ores, of which the following is a specification.

My invention relates, in general, to the treatment of manganese silver-ores, and in particular to those processes which by changing or destroying the manganese dioxid, render the ore amenable to subsequent treatment such, for example, as treatment with potassium or sodium cyanid, or by amalgamation, flotation or concentration, the object being to recover a larger percentage of silver.

The refractory character of the silver in these ores is due to the presence of the higher oxid of manganese, which renders the recovery of the silver difficult, either by cyanidation, amalgamation, flotation or concentration.

Heretofore various methods have been tried to solve the problem economically; for example, roasting, which through the action of carbon monoxid on the manganese dioxid reduces the latter to manganous oxid; or treatment with sulfurous acid, for a like reaction; or roasting, with sodium or other chlorids, to destroy the manganese dioxid and chloridize the silver.

These methods are all costly and, therefore, practically prohibitive, and are open to other objections, as, for example, the failure in some cases of the roasting process to make the whole of the silver amenable to cyanidation, and the loss of silver in the chloridizing process, due to volatilization of silver-chlorid.

The object of my invention is to secure the desired effect of rendering refractory manganese silver-ores amenable to subsequent cyanidation, amalgamation, flotation or concentration, by a preliminary step or treatment which is both economical and effective; and to this end my invention consists essentially in that step in the process, which comprises the preliminary treatment of the ore with pyrite $FeS_2$, in the presence of sulfuric acid. Instead of pyrite, marcasite, which is its equivalent and has the same composition, may be used.

In carrying out this treatment, the ore and pyrite or marcasite are pulverized together, thus insuring perfect mixing; and to the mixture is added the sulfuric acid. After this treatment, it is subjected to such recovery method as is customary. By this preliminary treatment of the ore with pyrite or marcasite and sulfuric acid, the manganic minerals are reduced to the manganous state, which is the effect desired, and which renders the ore amenable to the subsequent recovery treatment. That such reduction in the manganese dioxid takes place is shown physically by the fact that the pulp bleaches; and the presence of manganese in the lower form of oxidation can also be shown chemically by testing.

A concrete example of my treatment may be had from the following:—

I divided a certain sample of a very refractory manganese silver-ore, into two parts. The sample assayed 5.60 ounces of silver, and 1. ounce of gold per ton. One of the parts into which I divided said sample, I did not treat with my improvement, but simply agitated it, for 48 hours, with a solution of sodium cyanid, alkaline with lime. The tailing from the cyanid treatment assayed 5.20 ounces silver and .01 ounce gold, per ton, showing the extraction to be 7.14% of the silver and 99% of the gold.

The other part into which I divided said sample, I treated according to my invention, as follows:—

I added to 50 grams of the ore, 4 grams of pyrite and 50 cubic centimeters of 3% sulfuric acid. The pulp bleached. I then washed this pulp with water to remove the acid and soluble salts, and treated it with a solution of sodium cyanid, alkaline with lime, as above, and agitated it the same length of time. The tailing in this case assayed .10 ounce silver and only a trace of gold, showing the extraction to be 98.2% of silver and practically 100% of gold.

In giving this example of my invention, I am not to be understood as confining myself to the proportions stated, as these amounts used in the example are not in a critical ratio, as other amounts may produce the same result. In this particular instance there was a considerable proportion of the pyrite which was not acted upon. Nor is it necessary to add pure pyrite or marcasite, as material containing these might be used.

In the reaction of this treatment, the pyrite takes the oxygen from the manganese, reducing it from the manganic to the manganous state. In certain cases part or all of this manganous oxid is dissolved by the sulfuric acid, and such loss of acid as may thus occur or from the dissolving of impurities such as oxids of iron is compensated by the production of sulfuric acid due to the oxygen of the manganese dioxid ($MnO_2$) acting on the pyrite.

This fact and the abundance of pyrite and the ease with which it may be obtained make for economy which is the all important factor in the treatment of refractory silver-ores.

It is to be understood that the term pyrite as used in the claim includes marcasite, commonly known as white pyrite, both forms having the same composition $FeS_2$.

I give the following equation as indicating the probable reactions which take place in the reduction of the manganese dioxid:—

$$2FeS_2 + 15MnO_2 + H_2O = Fe_2(SO_4)_3 + 15MnO + H_2SO_4.$$

The above equation shows the reduction of the manganese dioxid to the manganous state; it also shows the formation of sulfuric acid from the oxidation of the pyrite.

Under certain conditions the ferric sulfate hydrolyzes, giving more free sulfuric acid, thus:—

$$Fe_2(SO_4)_3 + 3H_2O = Fe_2O_3 + 3H_2SO_4.$$

In some cases part of the manganous oxid is dissolved by the sulfuric acid:—

$$MnO + H_2SO_4 = MnSO_4 + H_2O.$$

These last two reactions depend considerably upon time, temperature, and concentrations. In some instances I have found the solution to be more strongly acid with sulfuric acid after the reduction of the manganese dioxid than before. In other instances the acidities were about equal before and after the reduction of the manganese dioxid. In another case when using a rather strongly acid solution there was a small consumption of acid.

I claim:—

1. In a process of treating manganese silver-ores, that step which consists in preliminarily treating said ore with pyrite in the presence of sulfuric acid.

2. The improvement in preparing refractory manganese silver-ores to render them amenable to subsequent treatment to recover their values, which consists in treating said ore with pyrite in the presence of sulfuric acid.

3. The process of treating manganese silver-ores which consists in preliminarily treating said ore with pyrite in the presence of sulfuric acid, and then recovering the values by suitable methods.

In testimony whereof I have signed my name to this specification in the presence of two subscribing witnesses.

LESLIE W. AUSTIN.

Witnesses:
H. T. REYNOLDS,
W. W. WALLACE.